Sept. 18, 1956  M. KOHN ET AL  2,763,129
LIGHTER FOR LIQUID OR GASEOUS FUEL
Filed June 1, 1955

United States Patent Office 2,763,129
Patented Sept. 18, 1956

2,763,129

LIGHTER FOR LIQUID OR GASEOUS FUEL

Maximilian Kohn and Josef Wesely, Heidenreichstein, Austria, assignors to Brüder Eisert Aktiengesellschaft, Vienna, Austria, an Austrian joint-stock company Application June 1, 1955, Serial No. 512,459

9 Claims. (Cl. 67—7.1)

This invention relates to a lighter for liquid or gaseous fuel, which comprises a flame source and two wind guard walls disposed on opposite sides of said source to define a combustion space.

In such lighters the walls of the wind guard are to be sufficiently spaced from the flame so that they will not impair the flame formation by a dissipation of heat and a restriction of the access of air. In lighters of the usual thickness it is sufficient, as a rule, to arrange the wind guard walls with a spacing corresponding to the thickness of the lighter. In a lighter designed with less than the usual thickness, e. g. for increased convenience in carrying, that spacing cannot be reduced unless the reliable formation of a flame of normal strength will be impaired.

It is an object of the invention to provide a lighter in which the width of the combustion space defined by the wind guard can be increased beyond the width thereof in an inoperative position.

It is another object of the invention to provide a lighter in which the width of the combustion space defined by the wind guard can be increased in position for use beyond the width of the lighter casing.

It is another object of the invention to provide a lighter comprising a wind guard which is arranged automatically to increase the width of the combustion space in position for use and a cover which can be closed to retain the wind guard in an inoperative position.

It is another object of the invention to provide a lighter comprising a wind guard which is arranged automatically to increase the width of the combustion space in position for use and a cover which can be closed to move the wind guard into an inoperative position.

It is another object of the invention to provide a lighter meeting the foregoing object, in which means are provided for retaining the cover in its closed position this means being effective but during a short final phase of the closing movement of the cover so that said movement is not restrained during a major portion thereof during which the cover causes the wind guard to be moved in an inoperative position.

It is another object of the invention to provide a lighter in which the combustion space defined by the wind guard can be enlarged to a predetermined width in a position for use.

It is another object of the invention to provide a lighter having a wind guard which can be laterally opened to provide access to the interior of the combustion space normally defined by the wind guard.

With these and other objects in mind, which will become apparent as the specification proceeds, at least one of the wind guard walls is arranged according to the invention to be swingable from the opposite wall to enlarge said combustion space.

The invention further provides a lighter cover adapted to assume open and closed positions relative to said flame source and in said closed position being arranged to hold said swingable wind guard wall in a swung-in position, and spring means arranged to urge said swingable wind guard wall to swing out.

Illustrative embodiments of the invention are shown in the drawing, in which.

Figure 1:
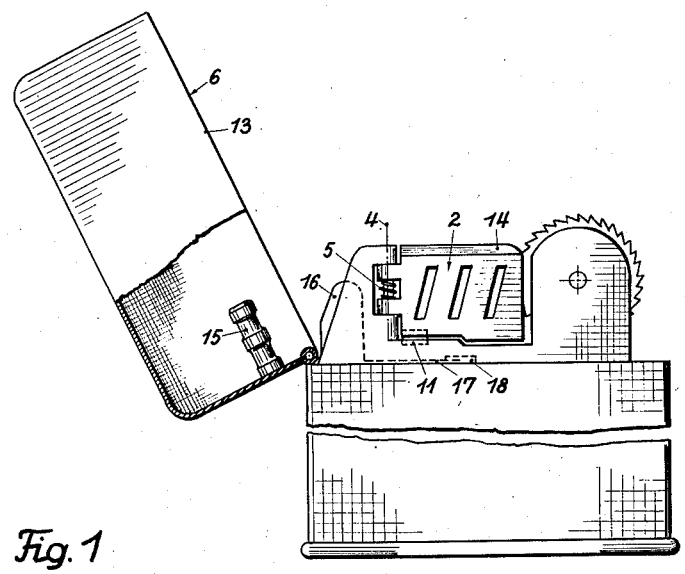
Fig. 1 is a front view, partly broken away, of the lighter.

At the top of the lighter casing 1 the wind guard walls 2 consisting of apertured rectangular sheets of metal are swingably arranged on the pins 4 on opposite sides of the flame source, here illustrated by the wick opening 3. The walls 2 are loaded by springs 5, which tend to urge the walls 2 into their swung-out position, shown in Fig. 2, when the lighter cover 6 has been opened. The walls 2 have angular lugs 7, 8, which slide over the edge portions 9, 10 of the casing while the walls are swinging out. The lug 7 of one wind guard wall 2 is provided with a flanged margin 11 (Fig. 3), which extends at right angles to the lug proper and engages the edge portion 10 of the lighter to limit the swing-out movement of the wall. Both walls 2 may be formed in this manner. In the embodiment shown in Figs. 1 to 3 the lug 8 is provided with a small boss 12 engaging the edge portion 9. Due to the resiliency of the lug 8 the boss 12 can be urged in the direction of the opening movement of the wall 2 to snap over the edge portion 9. Thus that wind guard wall can be opened fully, as is shown with broken lines in Fig. 2. This is of advantage for lighting a pipe or for other purposes requiring access to the wick, such as for adjusting the height of the wick, cleaning operations, etc.

As the cover 6 of the lighter is being closed the lower edges 13 of the cover engage the inclined top margins 14 of the walls 2 to swing the latter inwardly about the pins 4. When the cover is closed it will hold the walls in their swung-in position, in which they are substantially parallel to the cover wall. When the cover is opened the walls 2 will swing out automatically under the action of the springs 5 and at the same time the lighter is in such a position that it can be ignited by rotation of the flint wheel.

The cover 6 is held in its closed position by a pin 15 engaging a resilient retaining device 16. The pin is affixed to the inside wall of the cover close to the hinge thereof; the resilient retaining device consists of converging tongues which project from a leaf 17 which may be held on the top of the lighter, e. g. by the bushing 18 of the wick opening. The tongues can be fixed also to the pins 4, for instance. This cover retaining arrangement is particularly suitable in a lighter having outwardly swingable wind guard walls because the cover has to be urged against the resilient retaining means only during a short final phase of its closing movement whereas it is not restrained during the rest of the movement. For this reason a small pressure on the cover during its closing movement is sufficient to cause the walls to be swung inwardly.

Figure 2:
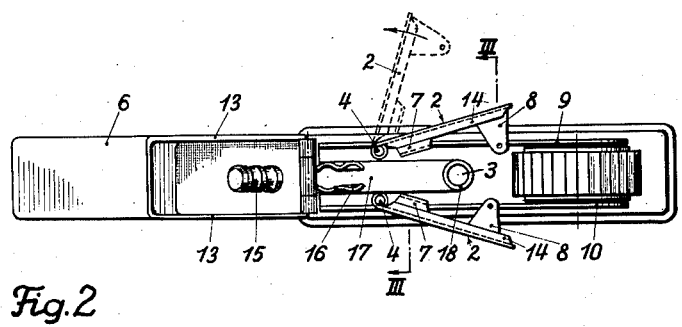
Fig. 2 is a top plan view of the lighter shown in Fig. 1.
Figures 3, 4, 5:
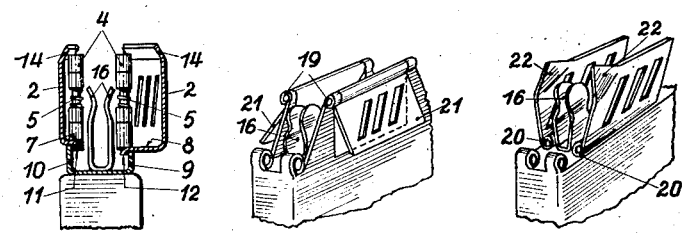
Fig. 3 is a sectional view taken on line III—III of Fig. 2.
Figs. 4 and 5 are perspective views showing details of two modified embodiments of the wind guard walls.

The pins on which the walls 2 are hinged may be arranged in another than the vertical position shown in Figs. 1 to 3. According to Figs. 4 and 5 they may consist of horizontal pins 19 and 20, respectively. In that case the inward movement of the walls will also be effected by the lighter cover during the closing movement thereof. According to Fig. 4 the walls 2 are downwardly and outwardly inclined; according to Fig. 5 they are upwardly and outwardly inclined; the inclined margins 21 and 22, respectively, cooperate with the side edges 13 of the cover.

What is claimed is:

1. In a lighter which comprises a lighter casing, a flame source and two wind guard walls disposed on opposite sides of said flame source to define a combustion space at least one axis secured to said lighter casing each for carrying one of said wind guard walls, at least one of said walls being swingable about said axis and away from the opposite wall to enlarge said combustion space.

2. A lighter as set forth in claim 1, in which said swingable wall is hinged on a vertical axis.

3. A lighter as set forth in claim 1, in which said swingable wall is hinged on a horizontal axis.

4. In a lighter the combination of a flame source, two wind guard walls disposed on opposite sides of said flame source to define a combustion space, at least one of said walls being arranged to be swingable away from the opposite wall to enlarge said combustion space, a hollow lighter cover adapted to assume open and closed positions relative to said flame source and in said closed position being arranged to receive and hold said swingable wind guard wall in a swung-in position, and spring means arranged to urge said swingable wind guard wall to swing out.

5. In a lighter the combination of a flame source, two wind guard walls disposed on opposite sides of said flame source to define a combustion space, at least one of said walls being arranged to be swingable away from the opposite wall to enlarge said combustion space, a hollow lighter cover adapted to assume open and closed positions relative to said flame source and in said closed position being arranged to receive and hold said swingable wind guard wall in a swung-in position, and spring means arranged to urge said swingable wind guard wall to swing out, said swingable wind guard wall having an inclined margin and said cover having a lower edge which is adapted to engage said inclined margin during movement of the cover from said open to said closed position in such a manner as to urge the swingable wind guard wall into its swung-in position.

6. In a lighter the combination of a casing carrying a flame source and two wind guard walls disposed on opposite sides of said flame source to define a combustion space, at least one of said walls being arranged to be swingable away from the opposite wall to enlarge said combustion space, said casing being formed with an engaging edge portion and at least one of said swingable wind guard walls being formed with angular lug means adapted to engage said engaging edge portions to limit the swinging movement of the wall away from the opposite one.

7. In a lighter the combination of a casing carrying a flame source and two wind guard walls disposed on opposite sides of said flame source to define a combustion space, at least one of said walls being arranged to be swingable away from the opposite wall to enlarge said combustion space, said casing being formed with an engaging edge portion and at least one of said swingable walls being formed with a resilient angular lug adapted to engage said engaging edge portions to limit the swing movement of the wall away from the opposite one and being adapted to snap over said engaging edge portion to enable a continued swinging movement of said wall whereby access is provided to said flame source.

8. In a lighter the combination of a casing carrying a flame source and two wind guard walls disposed on opposite sides of said flame source to combustion space, at least one of said walls being arranged to be swingable away from the opposite wall to enlarge said combustion space, a hollow lighter cover adapted to assume open and closed positions relative to said flame source and in said closed position being arranged to receive and hold said swingable wind guard wall in a swung-in position, spring means arranged to urge said swingable wind guard wall to swing out, said swingable wind guard wall having an inclined margin and said cover having a lower edge which is adapted to engage said inclined margin during a movement of the cover from said open to said closed position in such a manner as to urge the swingable wind guard into its swung-in position, a pin affixed to and projecting internally of said cover, and resilient retaining means carried by said casing and adapted to retain said pin in the closed position of the cover.

9. A lighter as set forth in claim 8, in which said retaining means comprise two converging resilient tongues adapted to grip said pin between them.

References Cited in the file of this patent

UNITED STATES PATENTS 2,521,181    Morse _____ Sept. 5, 1950